Feb. 19, 1952   R. P. McNERNEY   2,586,685
DECELERATION SIGNAL
Filed July 9, 1951

INVENTOR.
Robert P. McNerney.
BY
ATTORNEY.

Patented Feb. 19, 1952

2,586,685

UNITED STATES PATENT OFFICE 2,586,685

DECELERATION SIGNAL

Robert P. McNerney, Sharpsville, Pa., assignor of fifty per cent to Charles J. Songer, Farrell, Pa.

Application July 9, 1951, Serial No. 235,782

2 Claims. (Cl. 200—52)

1

This invention relates to signals and more particularly to a continuation-in-part of my co-pending patent application Serial No. 130,497, filed December 1, 1949, now Patent No. 2,573,479, dated October 30, 1951, on Deceleration Signal.

The principal object of the invention is the provision of a deceleration indicator for motor vehicles.

A further object of the invention is the provision of a deceleration signal incorporating a self-leveling mechanism operating by inertia to close an electrical circuit upon the deceleration of a vehicle in which the device is positioned.

A still further object of the invention is the provision of a deceleration signal incorporating dual means movable by deceleration of the motor vehicle to close an electrical circuit.

The deceleration signal shown and described herein comprises a continuation-in-part of my aforementioned co-pending patent application in which the inertia of a float secured to a pivot arm is utilized to close an electrical circuit. The present invention was disclosed originally in the said co-pending application as a modification thereof and incorporates a dual actuating means and comprising both an inertia actuated float and an inertia actuated weight, one above and one below an electrical switch which is imparted useful movement by the combined motions of the float and the weight.

The deceleration signal disclosed herein therefore comprises an improvement in the art of such signals in that a simple trouble-free mechanism is disclosed which may be attached to a motor vehicle in various locations and which will be operative when connected with a power source and a signal light on the vehicle in indicating instantaneously any deceleration in the vehicle. The deceleration signal disclosed herein is capable of maintaining its normal inoperative position despite any inclination of the motor vehicle to which it is attached.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation with parts broken away in cross section.

2

Figure 1:
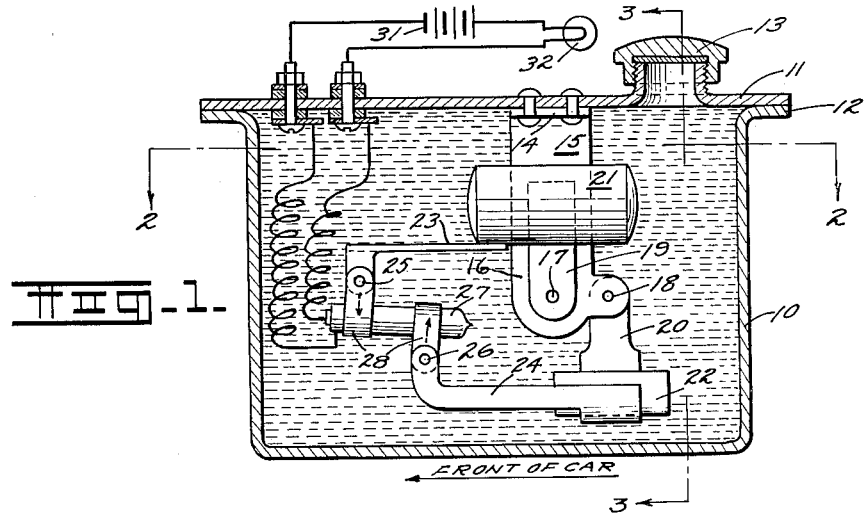

By referring to the drawings and Figure 1 in particular it will be seen that the deceleration signal comprises a liquid-tight housing 10 having a closure 11 secured thereto in a liquid-tight manner and specifically against an outturned flange 12 on the housing 10. An access opening 13 is formed in the closure 11 and provided with a cap 14 which is normally in position thereon so as to retain liquid such as a light oil in the housing 10 which is completely filled thereby. Secured to the closure 11 there is a body member 14 which incorporates a pair of spaced depending arms 15, the lowermost ends of which are inturned and downturned as at 16. The downturned ends 16 of the arms 15 have a pair of horizontally spaced pivots 17 and 18 positioned therebetween, the pivots 17 serving to pivotally affix the lower end of an arm 19 to the downturned ends 16 and the pivots 18 serving to affix the upper end of a secondary arm 20 to the said downturned ends 16. A float 21 is secured to the upper end of the arm 19 and a weight 22 is secured to the lowermost end of the secondary arm 20.

Figure 2:
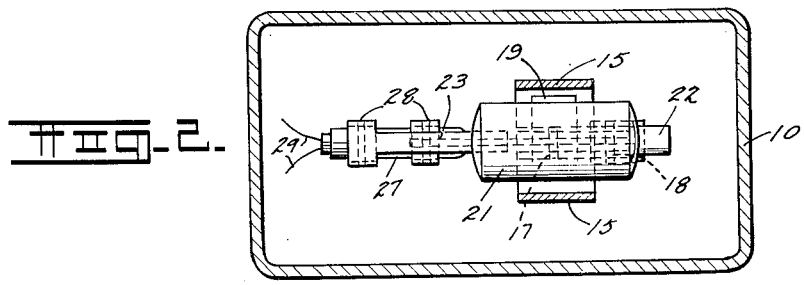
Figure 2 is a vertical section taken on line 2—2 of Figure 1.
Figure 3:
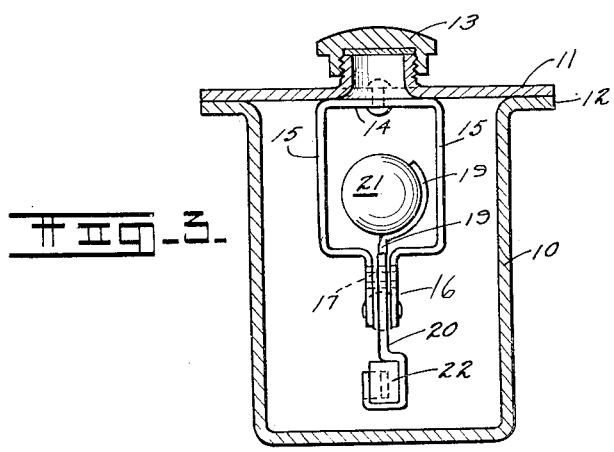
Figure 3 is a horizontal section taken on line 3—3 of Figure 1.

By referring to Figures 1 and 3 of the drawings it will be observed that the arms 19 and 20 are offset horizontally with respect to one another and at the same time positioned on a common vertical plane as best shown in Figure 3 of the drawings. The float 21 is adapted to pivot on the pivots 17 in the area between the arms 15 of the body member 14 and the weight 22 is adapted to pivot in an arc based on the pivot 18. The float 21 has a lever 23 extending outwardly from one end thereof, as best shown in Figures 1 and 2 of the drawings, and the weight 22 has a secondary lever 24 extending outwardly therefrom and beneath the lever 23. The lever 23 has a downturned end carrying a pivot 25 and the secondary lever 24 has an upturned end carrying a pivot 26. A tubular mercury switch 27 is positioned in a pair of bands 28 which are also pivoted to the pivots 25 and 26. It will be observed that the pivot 26 is spaced with respect to the pivot 18 the same distance as the spacing of the pivot 25 with respect to the pivot 17. Thus, motion of the float 21 toward the left, as shown in Figure 1 and indicated by the arrow on the float, responsive to deceleration of an automobile to which the housing 10 is secured, moves the lever 23 and the pivot 25 downwardly on an arc based on the pivot 17 whereas the same motion simultaneously results in the movement of the weight 22 to the left, as shown in Figure 1 of the drawings, and the movement of the pivot 26 upwardly on an arc based on the pivot 18. The mercury switch 27 being spaced uniformly between the pivots 25 and 26 will therefore have its left end, as shown in Figure 1 of the drawings, depressed by the action of the float 21 responsive to inertia while the right end of the mercury switch 27 will be elevated as occasioned by the action of the weight 22 responsive to inertia. The resulting motion imparted the mercury switch 27 is twice as rapid as would be occasioned by the action of either the float 21 or the weight 22 by themselves and the device is therefore capable of indicating deceleration earlier than would otherwise be the case.

It will occur to those skilled in the art that the mercury switch is so arranged that in horizontal or near horizontal position, as shown in Figure 1, the switch will remain open and that in order that a circuit be closed through the switch, the left end must be depressed and/or the right end must be elevated. Circuit wires 29, which are of the flexible type associated with mercury switches, connect the mercury switch 27 with terminals 30 which extend through the closure 11. A power source 31 and a signal light 32 are indicated diagrammatically in Figure 1 of the drawings to show a workable signal in connection with the device.

Those skilled in the art will also recognize that the filling of the housing 10 with a fluid such as oil renders the device operative and more efficient than would otherwise be the case as the float 21 seeks to maintain the arm 19 in the perpendicular position while the weight 22 seeks to maintain the secondary arm 20 in perpendicular position despite any tilt which may be imparted the housing 10 as a result of the operation of the automobile on which the device is installed.

In operation the device is preferably attached to the motor vehicle in the vicinity of one of the circuit wires normally used in connection with the stop light of the vehicle with the stop light switch and power source as known in the art. The device then acts as a secondary switch or circuit closer in the stop light circuit and is thereby capable of lighting the stop light of the vehicle well in advance of any action resulting from the application of the brakes of the vehicle and the subsequent closing of the usual stop light switch. For example, if the equipped motor vehicle is being driven along at a uniform rate of speed, the fluid will maintain the arms 19 and 20 in normal vertical position and the switch 27 in horizontal position and thereby open. This action is maintained despite any inclination of the motor vehicle as in going up or down a hill as the float 21, the weight 22, the arms 19 and 20 and the switch 27 all pivot freely on the pivot pins 17 and 18. However, at such time as the motor vehicle begins to decelerate, inertia of the float 21 and weight 22 causes the same to move to the left, as shown in Figure 1 of the drawings, which is the direction of the front of the vehicle and thereby tilts the mercury switch 27 to move it to closed circuit position. The inertia of the mercury in the switch 27 is also utilized at the same time to move toward the right end of the switch 27 at such time as the vehicle decelerates. Thus an instantaneous deceleration warning is given as the closed circuit energizes the stop light of the vehicle.

At such time as the deceleration of the vehicle ends, the float 21 and the weight 22 again seek their normal positions and move the arms 19 and 20 to vertical position and the switch 27 to horizontal position and thereby opens the circuit. Acceleration of the vehicle tends only to move the float 21 and the weight 22 to the right and thereby tilts the mercury switch 27 away from open position so that inertia of the mercury therein is unable to cause the same to flow sufficiently to reach the contacts and close the circuit therethrough. It will be observed that there is at no time any flow of the fluid in the housing 10 and in which the entire mechanism of the device is submerged. There is, therefore, no false action of the deceleration signal such as would occur if the device were responsive in operation or adjustment to the fluid level in the housing. It will also be seen that the device may be inexpensively constructed and that all of the working parts are assembled through the closure 11 and then positioned in the housing 10 by the positioning and securing of the closure 11 thereto.

It will thus be seen that the several objects of the invention have been met by the deceleration signal herein disclosed.

Having thus described my invention, what I claim is:

1. A deceleration signal comprising a liquid filled housing having a removable closure forming its top portion, a body member on said closure including spaced depending portions and pivot pins spacing said depending portions adjacent their lowermost ends, an arm pivoted to one of the pivot pins between the depending portions of the body member and a float secured to the upper end of said arm so as to maintain the same in normal vertical position, a secondary arm pivoted to the other of said pivot pins and a weight secured to the lower end of said secondary arm so as to maintain the same in normal vertical position, a lever secured to the float and extending outwardly therefrom and a secondary lever secured to the weight and extending outwardly therefrom, a mercury switch pivotally secured between the ends of said lever and secondary lever so as to receive upward and downward movement as occasioned by the movement of said float and weight responsive to inertia overcoming the normal floating position of the float and the normal suspended position of the weight.

2. A deceleration signal comprising a liquid container and structural means therein, a pair of pivot pins in said structural means, an arm pivoted to one of the pivot pins and a float secured to the upper end of the arm so as to maintain the same in normal vertical position, a secondary arm pivoted to the other one of said pair of pivot pins and a weight secured to the lower end of said secondary arm so as to maintain the same in normal vertical position, a lever secured to the float and extending outwardly therefrom and a secondary lever secured to the weight and extending outwardly therefrom, a mercury switch pivotally secured to the respective ends of said lever and secondary lever so as to receive upward and downward movement as occasioned by the movement of said float and weight responsive to inertia overcoming the normal floating position of the float and the normal suspended position of the weight.

ROBERT P. McNERNEY.

No references cited.